(12) United States Patent
Gumaer (10) Patent No.: US 9,548,794 B2
(45) Date of Patent: Jan. 17, 2017

(54) POWER FACTOR CORRECTION FOR CONSTANT CURRENT INPUT WITH POWER LINE COMMUNICATION

(71) Applicant: Traver Gumaer, Easthampton, MA (US)

(72) Inventor: Traver Gumaer, Easthampton, MA (US)

(73) Assignee: Cooper Technologies Company, Houston, TX (US)

( * ) Notice: Subject to any disclaimer, the term of this patent is extended or adjusted under 35 U.S.C. 154(b) by 732 days.

(21) Appl. No.: 13/887,195

(22) Filed: May 3, 2013

(65) Prior Publication Data

US 2014/0328415 A1    Nov. 6, 2014

(51) Int. Cl.
H04B 3/54 (2006.01)
H02M 7/219 (2006.01)
H02M 1/00 (2006.01)
H02M 1/42 (2007.01)

(52) U.S. Cl.
CPC .............. *H04B 3/542* (2013.01); *H04B 3/548* (2013.01); *H02M 1/4225* (2013.01); *H02M 7/219* (2013.01); *H02M 2001/0054* (2013.01)

(58) Field of Classification Search
CPC .............. G05F 1/66; G05F 1/70; H04B 3/542; H04B 3/54; H04B 3/548; H02M 1/42; H02M 7/162; H02M 1/4225; H02M 2001/0054; H02M 7/219; Y02B 70/126; Y02B 70/1491
USPC .............. 363/89, 73; 323/205, 315; 375/257
See application file for complete search history.

(56) References Cited

U.S. PATENT DOCUMENTS

| | | |
|---|---|---|
| 4,386,395 A | 5/1983 | Francis, Jr. |
| 4,683,529 A | 7/1987 | Bucher, II |
| 5,367,247 A | 11/1994 | Blocher et al. |
| 5,568,041 A | 10/1996 | Hesterman |
| 5,598,326 A | 1/1997 | Liu et al. |
| 5,614,812 A | 3/1997 | Wagoner |

(Continued)

FOREIGN PATENT DOCUMENTS

| | | |
|---|---|---|
| JP | 2001037252 | 2/2001 |
| JP | 2010115088 | 5/2010 |

(Continued)

OTHER PUBLICATIONS

Lopatkina, R., International Search Report and Written Opinion of the International Searching Authority for PCT/US2014/036248, Sep. 4, 2014, pp. 1-7.

(Continued)

*Primary Examiner* — Jessica Han
*Assistant Examiner* — Demetries A Gibson
(74) *Attorney, Agent, or Firm* — King & Spalding LLP (57) ABSTRACT

The present disclosure provides techniques for power factor correction on a constant current system and also provides power line communications on the same power factor correction circuit. In one example embodiment, through controlled charging and draining of an input capacitor, the power factor correction circuit generates an input voltage which is in phase with the input current. Communication data is also embedded in the input voltage and/or input current by further charging and draining of the input capacitor according to a controlled switching scheme which includes both input current phase data and corresponding communication signals.

15 Claims, 5 Drawing Sheets

(56) References Cited

U.S. PATENT DOCUMENTS

| | | | |
|---|---|---|---|
| 5,631,550 A | 5/1997 | Castro et al. | |
| 5,650,925 A | 7/1997 | Hesterman | |
| 5,682,306 A | 10/1997 | Jansen | |
| 5,804,950 A | 9/1998 | Hwang et al. | |
| 5,838,181 A | 11/1998 | Hesterman | |
| 5,844,399 A | 12/1998 | Stuart | |
| 6,043,633 A | 3/2000 | Lev et al. | |
| 6,177,782 B1 | 1/2001 | L'Hermite et al. | |
| 6,259,613 B1 | 7/2001 | Lee et al. | |
| 6,657,417 B1 | 12/2003 | Hwang | |
| 6,906,503 B2 | 6/2005 | Lopez-Santillana et al. | |
| 6,909,622 B2 | 6/2005 | Weng | |
| 7,088,079 B2 | 8/2006 | Lefedjiev | |
| 7,180,273 B2 | 2/2007 | Bocchiola et al. | |
| 7,205,749 B2 | 4/2007 | Hagen et al. | |
| 7,269,038 B2 | 9/2007 | Shekhawat et al. | |
| 7,279,876 B2 | 10/2007 | Adragna et al. | |
| 7,323,851 B2 | 1/2008 | Markowski | |
| 7,394,236 B2 | 7/2008 | Chapuis et al. | |
| 7,456,621 B2 | 11/2008 | Leung et al. | |
| 7,489,116 B2 | 2/2009 | Lanni | |
| 7,554,310 B2 | 6/2009 | Chapuis et al. | |
| 7,723,964 B2 | 5/2010 | Taguchi | |
| 7,746,040 B2 | 6/2010 | Garrity et al. | |
| 7,777,459 B2 | 8/2010 | Williams | |
| 7,821,237 B2 | 10/2010 | Melanson | |
| 7,889,517 B2 | 2/2011 | Artusi et al. | |
| 7,919,958 B2 | 4/2011 | Oettinger et al. | |
| 8,014,176 B2 | 9/2011 | Melanson et al. | |
| 8,076,920 B1 | 12/2011 | Melanson | |
| 8,094,472 B2 | 1/2012 | Chang et al. | |
| 8,125,197 B2 | 2/2012 | Hwang et al. | |
| 8,129,958 B2 | 3/2012 | Ku et al. | |
| 8,130,522 B2 | 3/2012 | Maksimovic | |
| 8,207,713 B2 | 6/2012 | Sugawara | |
| 8,228,046 B2 | 7/2012 | Ingemi et al. | |
| 8,248,145 B2 | 8/2012 | Melanson | |
| 8,270,190 B2 | 9/2012 | Adragna | |
| 8,279,630 B2 | 10/2012 | Choi | |
| 8,558,518 B2 | 10/2013 | Irissou et al. | |
| 8,587,970 B2 | 11/2013 | Uno et al. | |
| 8,797,771 B1* | 8/2014 | Lee | H02M 7/103 323/267 |
| 8,830,702 B2 | 9/2014 | Macfarlane | |
| 8,890,497 B2 | 11/2014 | Peschke | |
| 2004/0047166 A1* | 3/2004 | Lopez-Santillana | H02M 1/4225 363/89 |
| 2006/0255772 A1 | 11/2006 | Chen | |
| 2006/0284728 A1* | 12/2006 | Rubinstein | H02J 13/0051 375/257 |
| 2007/0036212 A1 | 2/2007 | Leung et al. | |
| 2008/0252268 A1 | 10/2008 | Feldtkeller et al. | |
| 2010/0027978 A1* | 2/2010 | Veik | H02P 7/292 388/809 |
| 2010/0202169 A1* | 8/2010 | Gaboury | H02M 1/4225 363/49 |
| 2010/0309699 A1* | 12/2010 | Nishikawa | H02M 1/4225 363/126 |
| 2011/0075462 A1* | 3/2011 | Wildash | H02M 1/4208 363/127 |
| 2011/0109283 A1 | 5/2011 | Kapels et al. | |
| 2011/0193494 A1 | 8/2011 | Gaknoki et al. | |
| 2011/0205763 A1 | 8/2011 | Artusi et al. | |
| 2011/0255319 A1* | 10/2011 | Ayukawa | H02M 1/4225 363/126 |
| 2011/0280053 A1 | 11/2011 | Halberstadt | |
| 2011/0309760 A1* | 12/2011 | Beland | H02M 1/4258 315/201 |
| 2012/0014150 A1 | 1/2012 | Domb | |
| 2012/0069615 A1 | 3/2012 | Tomioka | |
| 2012/0087159 A1* | 4/2012 | Chapman | H02J 3/383 363/41 |
| 2012/0106216 A1 | 5/2012 | Tzinker et al. | |
| 2012/0120696 A1 | 5/2012 | Nishijima | |
| 2012/0126759 A1 | 5/2012 | Lee et al. | |
| 2012/0146529 A1 | 6/2012 | Campbell et al. | |
| 2012/0169313 A1 | 7/2012 | Lee et al. | |
| 2012/0187863 A1 | 7/2012 | Nonaka et al. | |
| 2013/0088904 A1* | 4/2013 | Yamanaka | H02M 1/4225 363/126 |
| 2013/0187623 A1 | 7/2013 | Harel | |
| 2013/0320882 A1 | 12/2013 | Gaknoki et al. | |
| 2013/0322139 A1 | 12/2013 | Lee et al. | |
| 2014/0003105 A1 | 1/2014 | Lin et al. | |
| 2014/0078798 A1 | 3/2014 | Turchi | |
| 2014/0097808 A1 | 4/2014 | Clark et al. | |
| 2014/0320096 A1 | 10/2014 | Pansier | |
| 2014/0327411 A1 | 11/2014 | Gumaer | |
| 2014/0328096 A1 | 11/2014 | Gumaer | |
| 2014/0328097 A1 | 11/2014 | Gumaer | |

FOREIGN PATENT DOCUMENTS

| | | |
|---|---|---|
| KR | 2009005011 | 5/2009 |
| SU | 288182 | 12/1970 |
| WO | 2005041393 | 5/2005 |

OTHER PUBLICATIONS

Lopatkina, R., International Search Report and Written Opinion of the International Searching Authority for PCT/US2014/036256, Sep. 17, 2014, pp. 1-7.

Golovinova, I., International Search Report and Written Opinion of the International Searching Authority for PCT/US2014/036252, Sep. 17, 2014, pp. 1-7.

Golovinova, I., International Search Report and Written Opinion of the International Searching Authority for PCT/US2014/036254, Oct. 3, 2014, pp. 1-7.

Fairchild Semiconductor Corporation, Application Note 42047 Power Factor Correction (PFC) Basics, Aug. 19, 2004, 11 pages, Fairchild Semiconductor Corporation.

* cited by examiner

POWER FACTOR CORRECTION FOR CONSTANT CURRENT INPUT WITH POWER LINE COMMUNICATION

TECHNICAL FIELD

The present disclosure relates generally to power line communication on a power factor correction circuit. Specifically, the present disclosure relates to techniques for providing power line communication and power factor correction in a system having a constant current input.

BACKGROUND

Power factor correction is often used in electric power systems and between power sources and loads in order to synchronize the input current and the input voltage before it is delivered to the load. Power factor correction can provide many benefits to the electric power system and the load, such as prolonged life and energy efficiency.

Traditionally, power factor correction circuitry is designed as voltage based power factor correction. Such circuitry is used in constant voltage systems, and the input current waveform is made to match the input voltage waveform. However, in certain industries, such as airfield lighting, the existing infrastructure, requires current based systems which require a constant current power source rather than a constant voltage power source. Specifically, in the area of airfield lighting, constant current systems are traditionally used because of the need for consistent brightness across the plurality of light fixtures coupled in series and being powered by the same power source. Because a constant current power supply can provide the same level of current to each of the light fixtures, it became the standard form of power distribution in the area of airfield lighting. Though lighting technology has become more sophisticated in recent years, the infrastructure has remained a current based system. However, power factor correction techniques used for voltage based systems which receive a constant voltage generally cannot be used for current based systems.

Additionally, in many modern lighting systems, light fixtures are able to communicate with a central controller. For example, a light fixture may send a signal to the central controller indicative of operational data or error. The central controller may also send a signal to a light fixture containing an operational command or status request. In the airport lighting industry, such communication can be done through power line communication, in which communication and control signals can be sent between the central controller and light fixtures. Typically, an amplifier is used to add a higher frequency communication signal on top of the power line signal, such as a typical 60 hertz power line signal. A receiver is then used at the receiving end to decode the communication signal. Consequently, such communication systems typically require additional hardware and present several challenges, such as attenuation, error checking, and slow hardware.

SUMMARY

In an example embodiment of the present disclosure, a power factor correction circuit with power line communication includes an input capacitor configured to receive an input current from a constant current source and produce an input voltage, and a switching device coupled to the input capacitor, wherein the switching device switches between an OFF state and an ON state. The input voltage rises when the switching device is in the OFF state and drops when the switching device is in the ON state. The circuit includes a controller coupled to the switching device, wherein the controller controls switching of the switching device, and the switching of the switching device shapes the input voltage to be in phase with the input current. The switching of the switching device generates disturbances on the input voltage and input current, the disturbances having communication data.

In another example embodiment of the present disclosure, a controller for a power factor correction (PFC) circuit with power line communication includes a controller configured to receive an input current from a PFC circuit, an output voltage from the PFC circuit, and a communication signal. The controller generates a sine wave reference synchronized with the input current and adds the communication signal to the sine wave reference. The controller comprises a feedback controller configured to compare the output voltage to a reference voltage and produce a feedback controller output, wherein the feedback controller output increases when output voltage is below the reference voltage and decreases when the output voltage is above the reference voltage. The feedback controller output is multiplied with the summation of the sine wave reference and the communication signal to produce a control signal. A pulse width modulation (PWM) generator receives the control signal and converts the control signal into a corresponding PWM signal, wherein the PWM signal controls at least a portion of the PFC circuit. The PFC circuit shapes an input voltage to be in phase with current, and the input current, input voltage, or both include communication data reflective communication signal.

In another example embodiment of the present disclosure, a method of controlling a power factor correction (PFC) circuit having power line communication includes receiving an output voltage from a PFC circuit, receiving a reference voltage indicative of a desired power level of the output voltage, comparing the output voltage to the reference voltage, generating a feedback controller output based on the difference between the output voltage and the reference voltage. The method further includes receiving a sine wave reference synchronized with an input current from the PFC circuit, receiving a communication signal to be transmitted over the PFC circuit, summing the sine wave reference and the communication signal, and multiplying the feedback controller output by the sum of the sine wave reference and the communication signal to produce a sine control signal. The method also includes controlling the PFC with the sine control signal and shaping an input voltage to be in phase with the input current.

BRIEF DESCRIPTION OF THE DRAWINGS

For a more complete understanding of the disclosure and the advantages thereof, reference is now made to the following description, in conjunction with the accompanying figures briefly described as follows.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the present disclosure is not to suggest that all embodiments must include the referenced feature(s). The present disclosure provides systems and methods of power factor correction and integrated power line communications operating, on a constant current input source. The present disclosure is directed towards power distribution systems in the area of airfield lighting as an example application, but may be used with any other appropriate power distribution and power line communication system operating on a constant current input source.

In certain example embodiments, the present disclosure provides a power factor correction circuit having power line communication capabilities for use in systems with constant current input sources. In one example, the power factor correction circuit with power line communication is used in an airfield lighting, system which includes a plurality of individual light fixtures. Each of the light fixtures receives a constant current power supply from a central power source and can communicate with a central controller. In certain example embodiments, each or a subset of the light fixtures includes the power factor correction circuit with power line communications disclosed herein, which improves the energy efficiency of the light fixtures as well as the effectiveness and reliability of communication.

Figure 1:
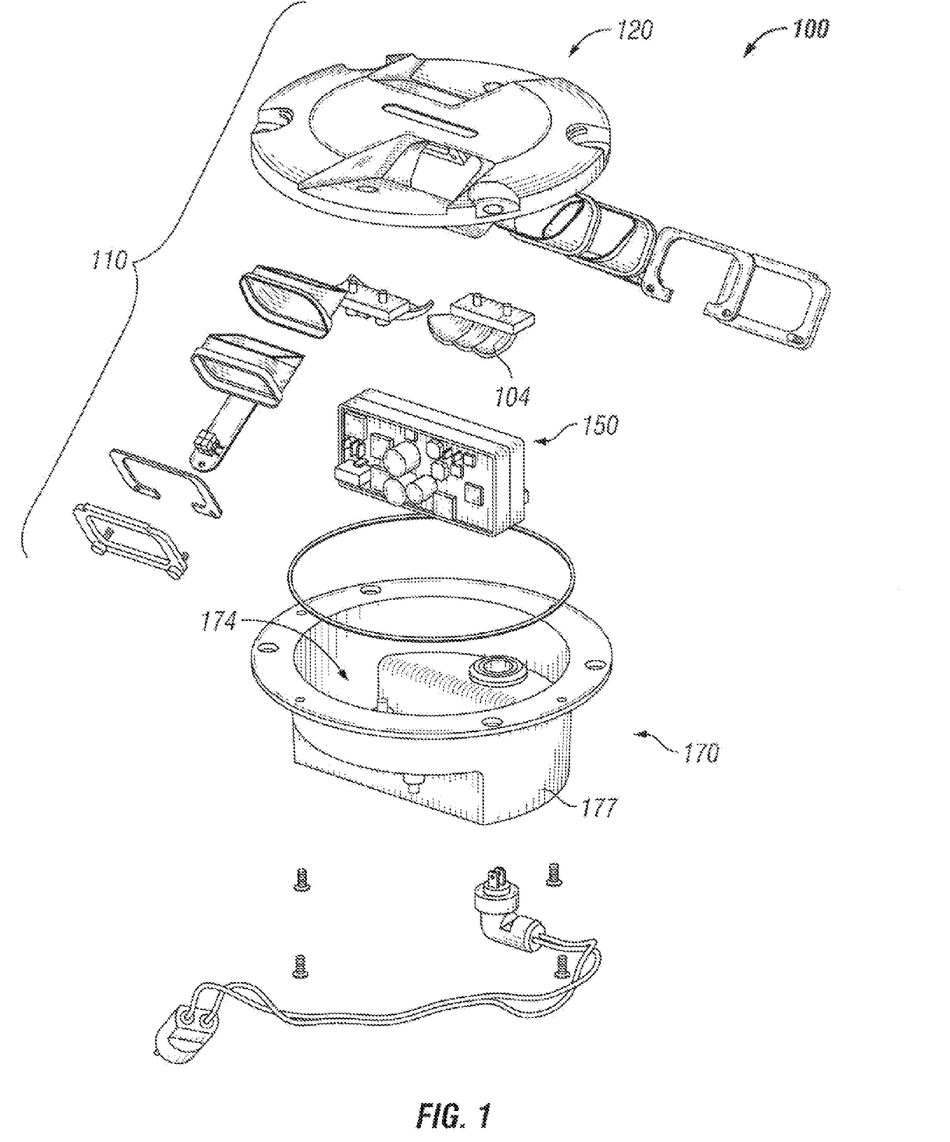
FIG. 1 illustrates a light powered by a constant current system and having a power factor correction circuit with power line communication, in accordance with an example embodiment of the present disclosure.

FIG. 1 shows an exploded perspective view of one such light fixture 100 in accordance with certain example embodiments. Referring now to FIG. 1, the light fixture 100 is an example of an airport runway and/or taxiway light fixture. The light fixture 100 of FIG. 1 includes a frame, a light source 104, and a power supply 150. The frame can include a cover 170 and optical housing 120. The light fixture 100 further includes an optical housing assembly 110. The optical housing assembly 110 includes the combination of one or more components associated with the mechanical structure and configuration of the optical housing 120 and other optical components, such as a body, lens, diffuser, connectors, and the like.

In certain example embodiments, the cover 170 includes at least one wall 177 that forms a cavity 174. Inside of the cavity 174 can be positioned at least one or more light sources 104 and the power supply 150. The cover 170 can include one or more features (e.g., ledges, apertures) that allow the various components disposed in the cavity 174 to fit and maintain electrical, mechanical, and/or thermal coupling with each other. The optical housing 120 protects the components disposed within the cavity 174, and can also secure the light sources 104 and the other internal components 130.

The power supply 150 includes one or more circuits and electrical components configured to receive the constant current input front the central power source, condition the received current, and drive the light sources 104. In certain example embodiments, the power supply includes the power factor correction circuit with power line communications disclosed herein. In certain example embodiments, the constant current input is conditioned for power factor correction before it is supplied, to the light sources 104, thereby improving energy efficiency. Additionally, the power line communications provided by the power factor correction circuit allows the light fixture 100 to be controlled by a central controller and exchange data with the central controller.

Figure 2:
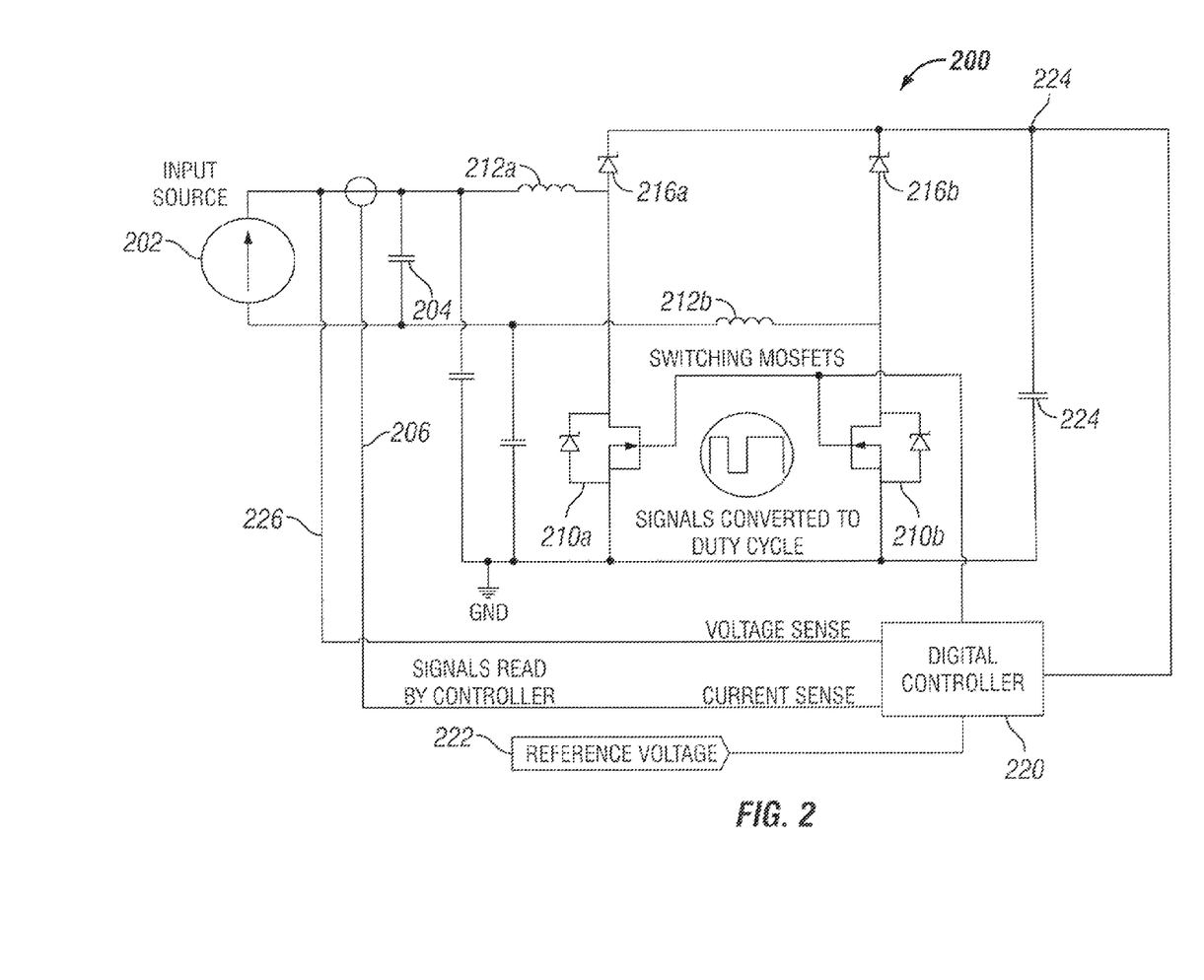
FIG. 2 illustrates a schematic diagram of a power factor correction circuit with power line communication for a constant current system, in accordance with an example embodiment of the present disclosure.

FIG. 2 illustrates a schematic diagram of a power factor correction (PFC) circuit with power line communications 200, in accordance with an example embodiment of the present disclosure. In certain example embodiments, the PFC circuit with power line communications 200 includes an input source 202, an input charging capacitor 204, a first inductor 212a, a first switching MOSFET 210a, and a first output diode 216a. The PFC circuit with power line communications 200 further includes a second inductor 212b, a second switching MOSFET 210b, a second output diode 216b, a controller 220, an output capacitor 214, and a DC output bus 224. The input source 202 provides a constant current power supply to the circuit 200. In certain example embodiments, the input source 202 provides a 6.6 amp, 60 hertz, sine wave. In certain example embodiments, the PFC circuit with power line communications 200 is largely identical to a PFC circuit for a constant current source. Specifically, the power line communication functions of the PFC circuit with power line communications 200 are readily carried out by a PFC circuit for a constant current source without additional communications hardware or cost.

PFC circuit with power line communications 200 provides power factor correction between the constant current power input source 202 and a load, such as a light fixture. Specifically, the PFC circuit with power line communications 200 receives power from the constant current input source 202 and outputs DC power via the DC output bus 224 to a load. The PFC circuit with power line communications 200 shapes the waveform of the input voltage at the input charging capacitor 204 to follow and be synchronized with the waveform of the input current. In certain example embodiments, the waveform of the voltage is at least partially shaped by controlling the charging and draining of the input charging capacitor by the first and second MOSFETs 210a, 210b. The input source 202 provides a constant alternating current, which is positive during one half cycle and negative during the other half cycle. Rather than rectifying the input current by using a diode rectifier bridge, the PFC circuit with power line communications 200 utilizes two MOSFETs 210a, 210b, coupled to the circuit 200 in opposite directions. Typically, a diode rectifier bridge includes a plurality (e.g., 4) of diodes, which results in a relatively large power loss. Thus, the ability to handle an alternating current without the use of a rectifier bridge significantly increases energy efficiency. However, in certain example embodiments of the PLC circuit with power line communications 200, the circuit 200 includes a diode rectifier bridge for rectifying the input current. In such an embodiment, only one MOSFET is needed as the MOSFET will always be biased. In the operation direction relative to the rectified current. In certain example embodiments, other appropriate switching devices are used in place of the MOSFETs.

For example, the first MOSFET 210a is in operation to control charging and draining of the input charging capacitor 204 when the input current is on the first half cycle (e.g., positive). During this time, the second MOSFET 210b, which is biased in the wrong direction when the current is in the first half cycle, acts as a short. Likewise, when the input current is in the second half cycle (e.g., negative), the second MOSFET 210b, which is now biased in the operational direction, can be switched to control the charging and draining of the input charging capacitor 204. During this time, the first MOSFET 210a, which is now biased in the wrong direction, acts as a short. In certain example embodiments, the first MOSFET 210a works in conjunction with the first inductor 212a and the first output diode 216a to produce a voltage having a waveform which matches the input current waveform. Likewise, the second MOSFET works in conjunction with the second inductor 212b and the second output diode 216b.

The following describes, in further detail, the operation of the PFC circuit with power line communications 200 for power factor correction purposes and bow it is controlled to produce a voltage waveform which is matched to the input current. Subsequently, the power line communication, functions of the PFC circuit with power line communications 200 will be described.

The first and second MOSFETs 210a, 210 may sometimes be referred to generically as "the MOSFET 210". The MOSFET 210 refers to either the first or second MOSFET 210a, 210b, depending on which half cycle the input current is in as the first and second MOSFETs 210a, 210b are identical in their operation relative to their given half cycle. Thus, the general operation of both the first MOSFET 210a and the second MOSFET 210b is described in terms of the MOSFET 210 for sake of brevity. Likewise, the first and second inductors 212a, 212b, which are respectively associated with the first and second MOSFETs 210a, 210b, may be referred to as "the inductor 212." Additionally, the first and second output diodes 216a, 216b, which are respectively associated with the first and second. MOSFETs 210a, 210b, may be referred to as "the output diode 216." The first MOSFET 210a and the second MOSFET 210b will be separately identified when as distinction is to be made.

Still referring to FIG. 2, in certain example embodiments, the input source 202 is directly coupled to the input charging capacitor 204. The input current from the constant current input source 202 charges the input charging capacitor 204 when the MOSFET 210 is in an off state. In certain example embodiments, the MOSFET 210 is initially off. Thus, in this state, the input current from the constant current input source 202 charges the input charging capacitor 204. As the input current charges the input charging capacitor 204, a voltage rise occurs in the input charging capacitor 204. When the voltage rises to a certain threshold level, the MOSFET 210 is switched on. In certain example embodiments, the threshold level is determined by a reference voltage 222 such that the voltage at the input charging capacitor 204 is allowed to rise until it reaches the level of the reference voltage 222. In certain example embodiments, the controller 320 provides the reference voltage 222 and also receives a sensed voltage signal 226 of the voltage at the input charging capacitor 204. The controller 220 also receives a sensed current signal 206 from the input current. In certain example embodiments, the reference voltage 222 is indicative of the level of desired output power, or the amplitude of the voltage waveform. The controller 220 compares a sensed voltage signal 226 to the reference voltage 222 and controls the MOSFET 210 accordingly. The controller 220 will be described in further detail below with respect to FIG. 3. The controller 220 sends a switching signal to both the first MOSFET 210a and the second MOSFET 210b. However, only one of the first and second MOSFETs 210a, 210b will be able to operate accordingly at one time.

When the voltage at the input charging capacitor 204 reaches the reference voltage 222, the MOSFET 210 is switched on. When the MOSFET 210 is switched on, current is drained, from the input charging capacitor 204 and the voltage drops accordingly. Thus, voltage at the input charging capacitor 204 rises when the MOSFET 310 is off and drops when the MOSFET 210 is on, creating a waveform which follows the duty cycle of the MOSFET 210. During the time the MOSFET 210 is on, current rises in the inductor 223. Thus, when the MOSFET 210 is switched of again, the inductor flies back and delivers energy, which is rectified by the output diode 216, to the output capacitor 314. The voltage at the output capacitor 214 is provided to a DC output bus 224 and configured to be delivered to a load. As the MOSFET 210 switches at a high frequency (hundreds of kHz) according to a controlled duty cycle, the instantaneous voltage at the input charge capacitor 204 will match the reference voltage, of each cycle. Thus, a sine wave input voltage in which the waveform is matched to the waveform of the input current is created over time. Specifically, for example, during the first half cycle, the first MOSFET 210a is switchable, by the controller 220, between the on state and the off state. During the second half cycle, the second MOSFET 210b is switchable, by the controller 220, between the on state and the off state.

In another example embodiment, the controller 220 does not necessarily monitor the input voltage 226. Rather, the switching device is provided with a pulse width modulation signal shaped like a sine wave regardless of the input voltage, which forces the input voltage to take on a waveform as defined by the pulse width modulation signal.

In another embodiment of the present disclosure, the PFC circuit with power line communications 200 includes a flyback configuration. In such an embodiment, the first and second inductors 212a, 212b are replaced with first and second transformers (not shown), respectively. The secondary windings of the first and second transformers provide the output voltage. However, because the transformers provide a variable transformer ratio, the level of output voltage can be controlled by adjusting the transformer ratio.

As briefly discussed, the PFC circuit with power line communications 200 is able to provide, carry, and read communication signals in additional to power line input without the addition of extra components or costs to the base PFC circuit 200. In certain embodiments, the base PFC circuit 200 is configured differently and contains different components for the purpose of carrying out power factor correction. Such modifications should not be seen as additional components for carrying out power line communications, but rather as embodiments of the disclosed base PFC circuit 200. Indeed, rather than using additional communications equipment to drive communication signals onto power lines, the PVC circuit with power line communications 200 allows the duty cycle of the switching MOSFETs 110 in the PFC circuit 200 to be manipulated to create controlled voltage and current disturbances on the input voltage 226 and current 206. The voltage and current disturbances are or represent the communication signal to be transmitted. The communication signal is then read by the controller 220 or other processor at the load. In certain example embodiments, the communication signal to be transmitted is provided and embedded in the power signal by the controller 220 of the sending device, the details of which are further provided below with respect to FIG. 3.

Figure 3:
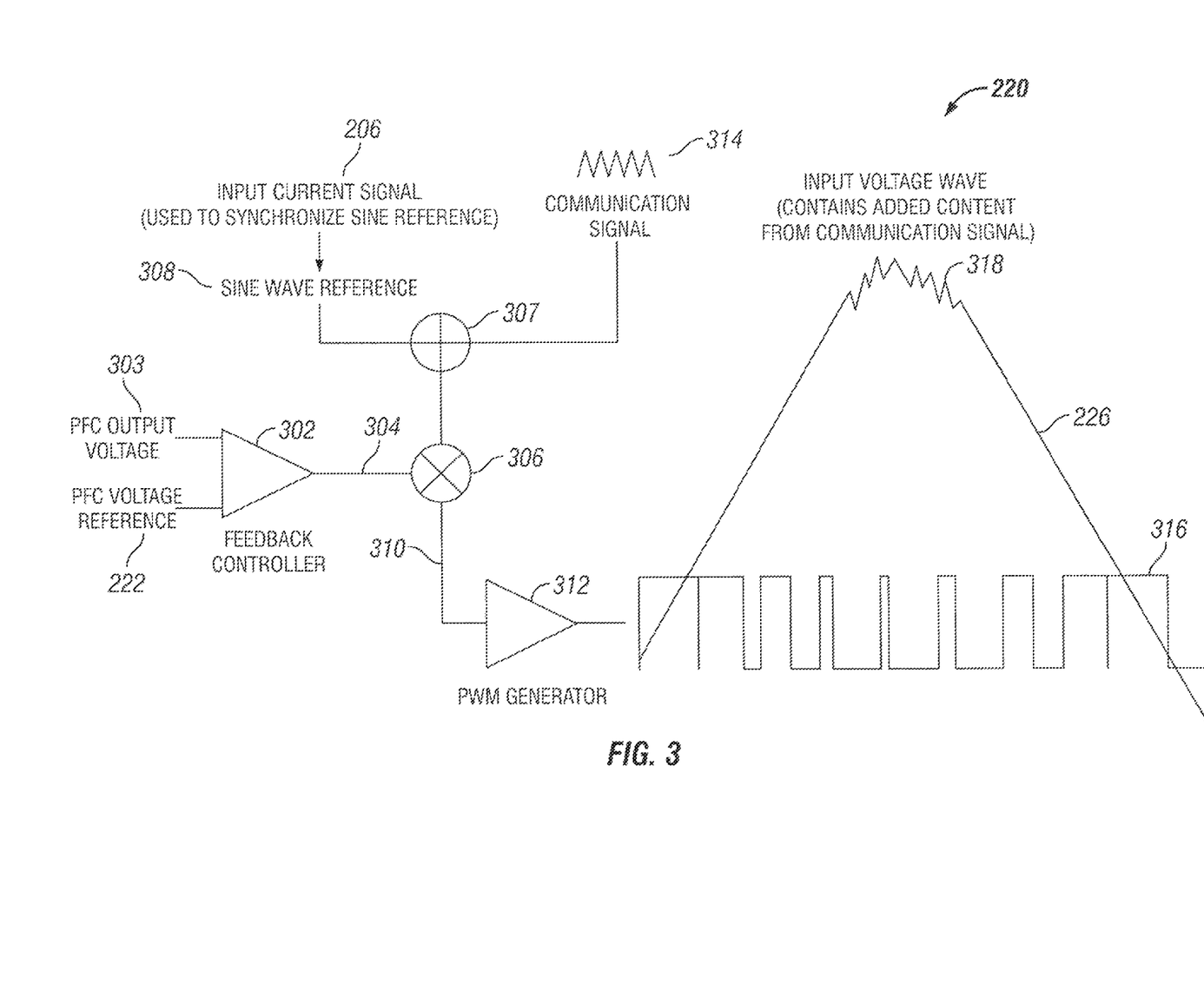
FIG. 3 illustrates a diagram of a controller of the power factor correction circuit with power line communication of FIG. 1, in accordance with an example embodiment of the present disclosure.

FIG. 3 illustrates a diagrammatical representation of the controller 220 of FIG. 2, in accordance with an example embodiment. The controller 220 provides switching control of the MOSFETs 210 for power factor correction purposes as well as power line communication purposes. For power factor correction purposes, the controller 220 includes a feedback controller 302 which receives, as inputs, a sense output voltage 303 from the DC output bus 224 and the reference voltage 222. The value of the reference voltage 222 is typically selected according to the desired amount of power to be provided at the DC output bus 224. The value of the sensed output voltage 303 is compared with the value of reference voltage 222. If the value of the sensed output voltage 303 is below the value of the reference voltage 222, the output 304 of the feedback controller 302 will increase. If the value of the sensed output voltage 303 is above the value of the reference voltage 222, the output 304 of the feedback controller 302 will decrease. The output 304 of the feedback controller 302 is then multiplied 306 by a sine wave reference 308. In certain example embodiments, the input current signal 206 is applied to the sine wave reference 308 to synchronize the sine wave reference 308 with the input, current signal 206. Thus, the output 310 of the multiplication 306 of the sine, wave reference 308 and the feedback controller output 304 is a sine control signal 310 which varies in amplitude with the feedback controller output 304.

In certain example embodiments, such as when a communication signal is to be sent over the power lines, a communication signal 314 is added to the sine wave reference 308. Thus, the summation 307 of the sine wave reference 308 and the communication signal 314 is synchronized with the input current waveform and also includes the communication signal 314. In such an embodiment, the summation 307 of the sine wave reference 308 and the communication signal 314 is multiplied with the feedback controller output 304 to produce a sine wave 310 which varies in amplitude with the feedback controller output 304, and includes input current synchronization 308 and the communication signal 314.

In certain example embodiments, the controller 220 further includes as pulse width modulation (PWM) generator 312. The PWM generator 312 receives as input, the sine control signal 310 and converts the sine control signal 310 into a pulse width modulation signal 316. The pulse width modulation signal 316 is used to drive the MOSFET 210 (FIG. 2). In certain example embodiments, the duty cycle of the pulse width modulation signal 316 decreases to increase the input voltage 226, and the pulse modulation signal 316 increases to decrease the input voltage 226. At the peaks of the sine control signal 310, the pulse width modulation signal 316 is at its controlled minimum, and the input voltage is at its peak. Thus, the peaks of the input voltage waveform are matched to the peaks of the sine control signal 310, which has been synchronized with the input current 206. Therefore, the input voltage waveform is matched to that of the input current 206.

In certain example embodiments, the sine control signal 310 includes communication content 318 from of an embedded communication signal 314. As such, the PWM generator 312, upon receiving such a sine wave, will produce a variable duty cycle that not only controls MOSFET switching for power factor as described above, but also controls MOSFET switching to create as signal on the voltage waveform on the input voltage 226 which carries communication data 318 representative of the communication signal 314. Such communication data 318 can be seen as disturbances 318 on the input voltage 226 and current 206 waveforms, which can be seen and/or read by other devices, controllers, or processors in the load or in the system.

Figure 4:
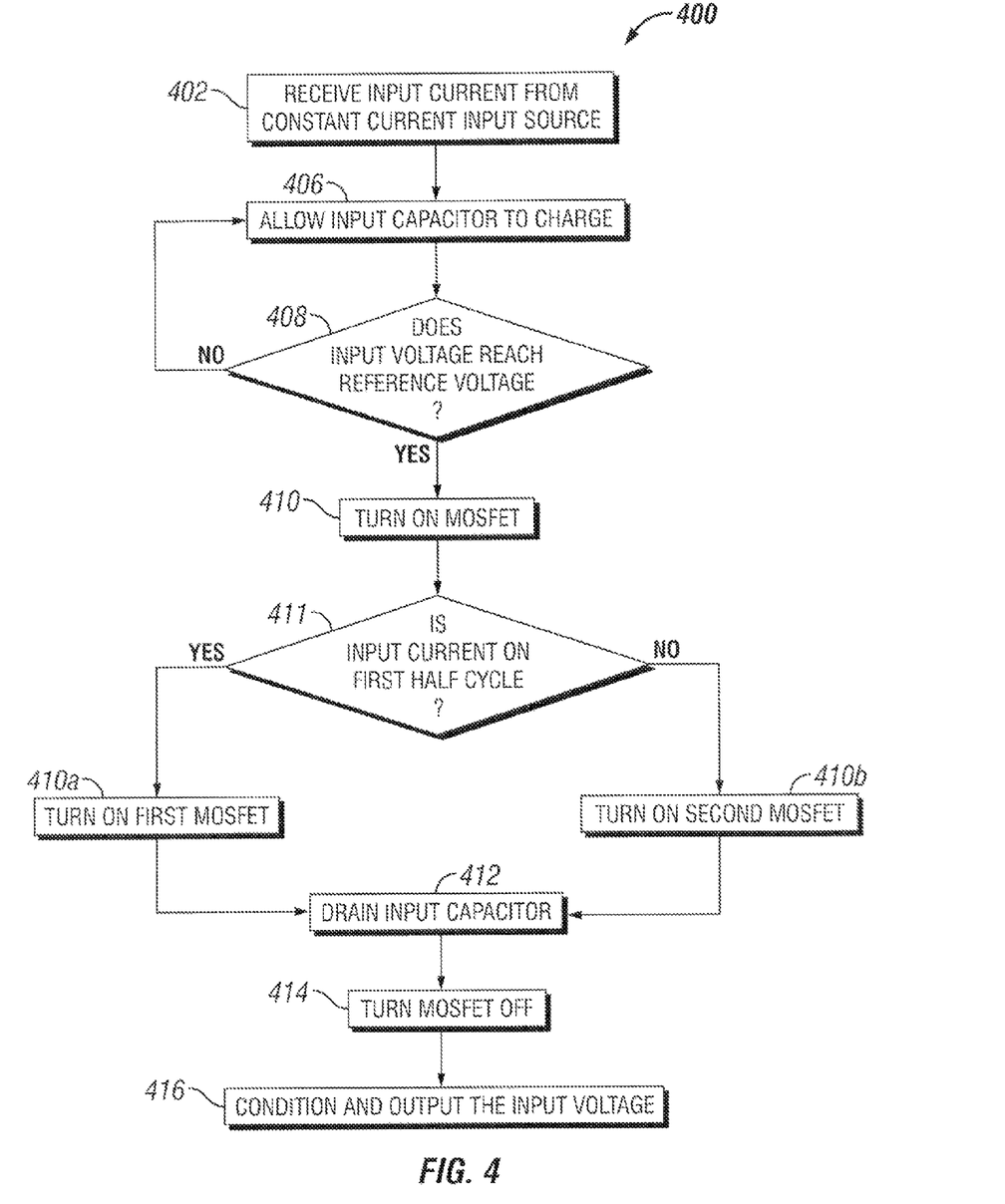
FIG. 4 illustrates a flow chart of a method of current-based power factor correction, in accordance with an example embodiment of the present disclosure.
Figure 5:
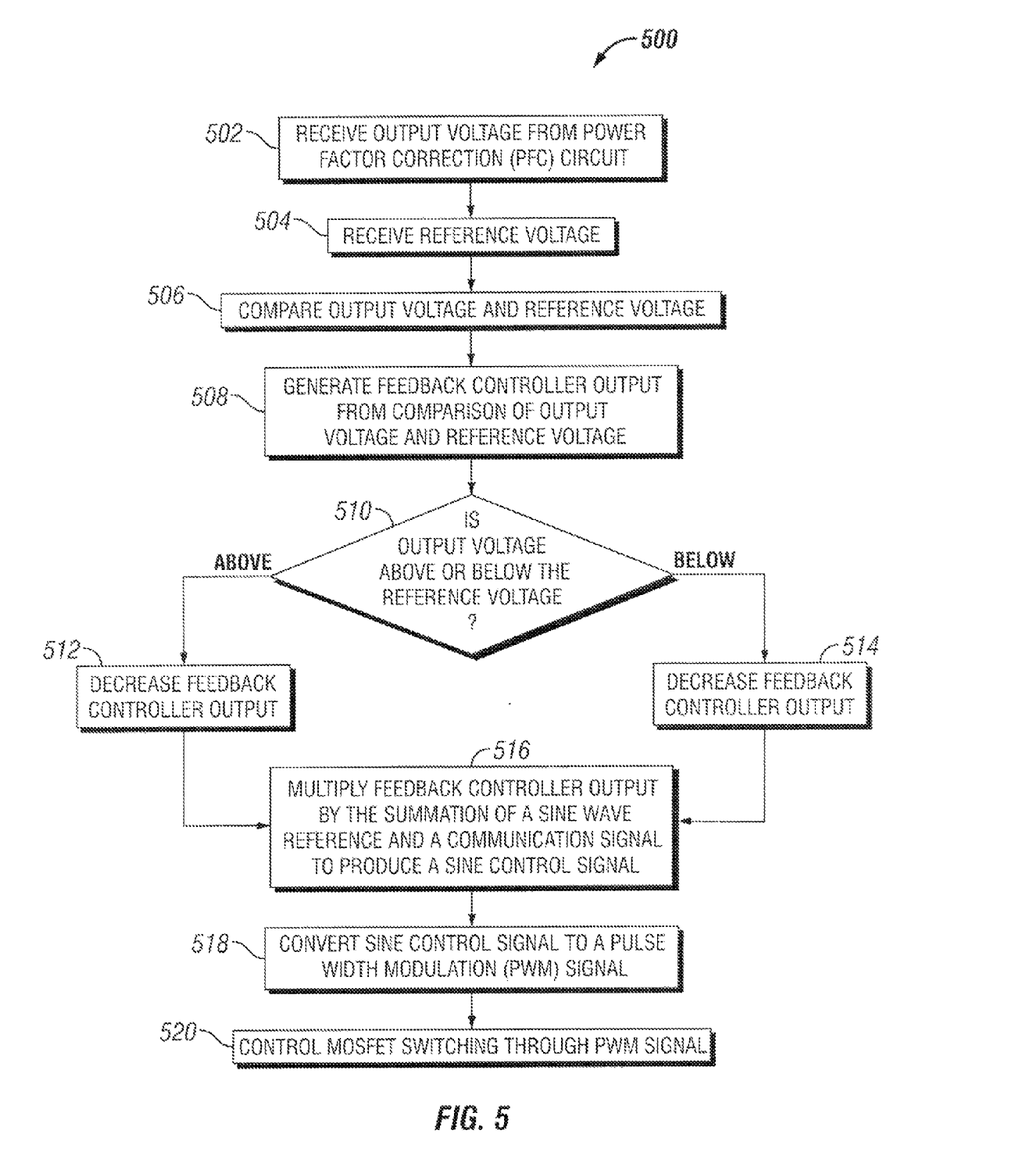
FIG. 5 illustrates a flow chart of a method of controlling a power factor correction circuit with power line communication, in accordance with an example embodiment of the present disclosure.

FIG. 4 illustrates a method 400 of power factor correction for a constant current system, in accordance with an example embodiment. FIG. 5 illustrates a method 500 of controlling the PFC circuit with power line communications 200, in accordance with an example embodiment. Specifically, in certain example embodiments, the method of power factor correction 400 is implemented via the power factor correction circuit of FIG. 2 and the method of controlling 500 the PFC circuit with power line communications 200 is implemented via the controller 220 illustrated in FIG. 3. Referring to FIGS. 2 and 4, the method 400 of power factor correction includes receiving an input current from a constant current input source 202 (step 402). The method 400 further includes allowing the input capacitor 204 to be charged (step 406). Specifically, in certain example embodiments, the MOSFET 210 is initially in the off state. As previously discussed, when the MOSFET 210 is in the off state, the input capacitor charges, and the input voltage increases. In certain example embodiments, the input voltage is constantly being monitored by the controller 220 via the input voltage sense 226. The method further includes determining whether the input voltage has reached the reference voltage (block 408). In certain example embodiments, the reference voltage includes an amplitude indicative of the desired level of power output as well as a phase which is synchronized with the input current.

In order to make the determination, the controller 220 compares the value of the input voltage to the value of the reference voltage. If it is determined that the input voltage is less than the reference voltage, the method goes to step 406, in which the MOSFET 210 remains off and the input capacitor is allowed to charge. As discussed, the MOSFET 210 (first MOSFET 210a or second MOSFET 210b) that is operational depends on the half (positive or negative) of the input current cycle. In certain example embodiments, steps 406 and 408 are repeated until it is determined at step 408 that the input voltage has reached the reference voltage. In certain example embodiment, the controller 220 constantly monitors the input voltage and reacts when the sensed voltage value reaches a threshold representative of the reference voltage. When it is determined that the input has reached the reference voltage, the MOST 210 switches on (step 410).

Specifically, in certain embodiments, it is determined whether the input current is on the first half cycle (step 411). If the input is on the first half cycle, then the first MOSFET 210a is correctly biased and operational. Therefore, the first MOSFET 210a turns on (block 410a), if the input current is not on the first half cycle, than it must be on the second half cycle. In that case, the second MOSFET 210b turns on (step 410b). When the MOSFET 210 (either first MOSFET 210a or second MOSFET 210b) turns on, the input capacitor drains (step 412), and the input voltage drops. The method 400 further includes switching the MOSFET 210 off again (step 414) to allow the input voltage to rise again, forming a sinusoidal waveform. As explained above, MOSFET 210 refers to whichever one of the first MOSFET 210a and the second MOSFET 210b that is presently operational. The method 400 also includes continuously conditioning and outputting the input voltage via a DC output bus 224 (step 416). In certain example embodiments, the input voltage is filtered by the inductor 212 and rectified by the output diode 216. With such a method, the voltage output 226 of a constant current power correction circuit is made to match and follow the phase of the constant current input current. Thus, power efficiency is improved.

Referring to FIGS. 3 and 5, the method 500 of controlling the PFC circuit with power line communications 200 includes receiving the output voltage 303 from the EEC circuit 200 (step 502) and receiving the reference voltage 222 (step 504). In certain example embodiments, the output voltage 303 and the reference voltage 222 are received by the feedback controller 302. The method 500 farther includes comparing the output, voltage 303 to the reference voltage 222 (step 506). Accordingly, in certain example embodiments, the feedback controller 302 handles the comparison. The method 500 also includes generating a feedback controller output 304 from the comparison of the output voltage 303 and the reference voltage 222 (step 508). In comparing the output voltage 303 and the reference voltage 222, the method also determines whether the output voltage 303 is above or below the reference voltage 222 (step 510). If the output voltage 303 is above the reference voltage 222, then the feedback controller output 304 is decreased (step 512). If the output voltage 303 is below the reference voltage 222, then the feedback controller output 304 is increased (step 514). The method further includes multiplying 306 the feedback controller output 304 by the summation 307 of the sine wave reference 308 and the communication signal 314 to produce the sine control signal 310 (step 516). In certain example embodiments, the sine wave reference 308 has been synchronized with the input current waveform and thus includes the current phase. As such, the sine control signal 310 includes the desired amplitude data from the reference voltage 222, current phase data from the sine wave reference 308, and communication data from the communication signal 314. The method further includes converting the sine control signal 310 to a pulse width modulation (PWM) signal 316 (step 518). In certain example embodiments, the PWM generator performs step 518. The method also includes controlling the switching of the MOSFETs 210 through the PWM signal 316 (step 520). Thus, through the controlled switching of the MOSFETs 210, the input voltage 226 is formed to be in phase with the input current 206, have a desired amplitude as provided by the reference voltage, and contain communication data 318 as provided by the communication signal 314. In certain example embodiments, the method includes controlling the first and second MOSFETs 210a, 210b, depending on the half cycle of the input current. In certain other example embodiments, such as in a PFC circuit having a rectifier diode bridge, the method includes controlling a single MOSFET.

The present disclosure provides techniques for power factor correction with power line communications on a constant current system by matching the voltage waveform to the input current waveform. Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A power factor correction circuit with power line communications, comprising:
   an input capacitor configured to receive an input current from a constant current source and produce an input voltage, the input capacitor to be coupled in a parallel configuration with the constant current source;
   a switching device coupled to the input capacitor, wherein the switching device switches between an OFF state and an ON state, and wherein the input voltage rises when the switching device is in the OFF state and drops when the switching device is in the ON state; and
   a controller coupled to the switching device, wherein the controller controls switching of the switching device between the OFF state and the ON state, and the switching of the switching device shapes the input voltage to be in phase with the input current, and wherein the switching of the switching device generates disturbances on the input voltage and the input current, the disturbances having communication data.

2. The power factor correction circuit with power line communications of claim 1, further comprising:
   a rectifier diode bridge configured to receive the input current from the constant current source and rectify the input current.

3. The power factor correction circuit with power line communications of claim 1, further comprising:
   a first switching device coupled to the input capacitor, wherein the first switching device is operable during a first half cycle of the input current and shorted during a second half cycle of the input current, and switches between the OFF state and the ON state when operable;
   a second switching device coupled to the input capacitor, wherein the second switching device is operable during the second half cycle of the input current and shorted during the first half cycle of the input current, and switches between the OFF state and the ON state when operable.

4. The power factor correction circuit with power line communications of claim 1, wherein the switching device comprises a MOSFET.

5. The power factor correction circuit with power line communications of claim 1, further comprising:
   a DC output bus providing an output voltage, wherein the output voltage is a conditioned form of the input voltage, wherein the input voltage is in phase with the input current.

6. The power factor correction circuit with power line communications of claim 5, further comprising:
   a first inductor coupled to the input capacitor, wherein the first inductor provides the output voltage during a first half cycle of the input current; and
   a second inductor coupled to the input capacitor, wherein the second inductor provides the output voltage during a second half cycle of the input current.

7. The power factor correction circuit with power line communications of claim 1, wherein the controller produces a sine control waveform, the sine control waveform containing a desired voltage amplitude data, an input current phase data, and a communication data.

8. The power factor correction circuit with power line communications of claim 7, wherein the controller comprises a pulse width modulation (PWM) generator which receives the sine control waveform and generates a corresponding PWM signal, wherein the PWM signal is used to control switching of the switching device.

9. A power factor correction circuit with power line communications, comprising:
   an input capacitor configured to receive an input current from a constant current source and produce an input voltage;
   a switching device coupled to the input capacitor, wherein the switching device switches between an OFF state and an ON state, and wherein the input voltage rises when the switching device is in the OFF state and drops when the switching device is in the ON state; and
   a controller coupled to the switching device and configured to receive a communication signal, wherein the controller controls switching of the switching device, and the switching of the switching device shapes the input voltage to be in phase with the input current, and wherein the switching of the switching device generates disturbances on the input voltage and the input current, the disturbances having communication data corresponding to the communication signal.

10. The power factor correction circuit with power line communications of claim 9, wherein the controller generates a sine wave reference synchronized with the input current and adds the communication signal to the sine wave reference.

11. The power factor correction circuit with power line communications of claim 9, wherein the controller comprises a pulse width modulation (PWM) generator that generates a PWM signal and wherein the PWM signal is used to control switching of the switching device.

12. The power factor correction circuit with power line communications of claim 9, further comprising a rectifier diode bridge configured to receive the input current from the constant current source and rectify the input current.

13. The power factor correction circuit with power line communications of claim 9, wherein the switching device comprises a MOSFET.

14. The power factor correction circuit with power line communications of claim 13, wherein when the MOSFET is in the OFF state, the input capacitor charges and the input voltage rises, and when the MOSFET is in the ON state, the input capacitor drains and the input voltage drops.

15. The power factor correction circuit with power line communications of claim 9, further comprising:
   a first inductor coupled to the input capacitor, wherein the first inductor provides an output voltage during a first half cycle of the input current; and
   a second inductor coupled to the input capacitor, wherein the second inductor provides the output voltage during a second half cycle of the input current, wherein the output voltage is a conditioned form of the input voltage and wherein the input voltage is in phase with the input current.

\* \* \* \* \*